(12) United States Patent
Kita

(10) Patent No.: US 7,281,114 B2
(45) Date of Patent: Oct. 9, 2007

(54) MEMORY CONTROLLER, FLASH MEMORY SYSTEM, AND METHOD OF CONTROLLING OPERATION FOR DATA EXCHANGE BETWEEN HOST SYSTEM AND FLASH MEMORY

(75) Inventor: Kenzo Kita, Tokyo (JP)

(73) Assignee: TDK Corporation (JP)

( * ) Notice: Subject to any disclaimer, the term of this patent is extended or adjusted under 35 U.S.C. 154(b) by 216 days.

(21) Appl. No.: 10/794,478

(22) Filed: Mar. 4, 2004

(65) Prior Publication Data

US 2005/0144418 A1 Jun. 30, 2005

(30) Foreign Application Priority Data

Dec. 26, 2003 (JP) ............................. 2003-435662

(51) Int. Cl.
*G06F 12/10* (2006.01)
(52) U.S. Cl. ...................... 711/203; 711/202
(58) Field of Classification Search ................ 711/203, 711/202
See application file for complete search history.

(56) References Cited

U.S. PATENT DOCUMENTS

| | | | | |
|---|---|---|---|---|
| 4,498,146 A | * | 2/1985 | Martinez ..................... | 711/115 |
| 5,386,527 A | * | 1/1995 | Bosshart ..................... | 711/3 |
| 5,943,693 A | * | 8/1999 | Barth ......................... | 711/220 |
| 6,751,639 B2 | * | 6/2004 | Szajnowski ................. | 708/250 |
| 2002/0004878 A1 | * | 1/2002 | Norman ....................... | 711/103 |
| 2002/0013879 A1 | * | 1/2002 | Han ............................ | 711/103 |
| 2004/0093457 A1 | * | 5/2004 | Heap ............................ | 711/5 |
| 2004/0139282 A1 | * | 7/2004 | Yoshioka et al. ........... | 711/133 |

FOREIGN PATENT DOCUMENTS

| | | |
|---|---|---|
| JP | 2000-284996 | 10/2000 |
| JP | 2002-73409 | 3/2002 |
| JP | 2003-15946 | 1/2004 |

\* cited by examiner

*Primary Examiner*—Sanjiv Shah
*Assistant Examiner*—Jae Un Yu
(74) *Attorney, Agent, or Firm*—Townsend and Townsend and Crew

(57) ABSTRACT

There is disclosed a controller included in a flash memory system attachable to a memory interface of a host system. The controller performs a process for minimizing the maximum number of defective blocks to be classified into each zone, by using a plurality of replacement tables or a plurality of functions. Specifically, a dispersion process unit included in the controller associates virtual block addresses VBA with physical block addresses PBA so as to minimize the maximum number of defective blocks to be classified into each zone. The flash memory system may have a plurality of replacement tables describing correspondence between virtual block addresses VBA and physical block addresses PBA. Or, in the flash memory system, plural kinds of functions for setting correspondence between virtual block addresses VBA and physical block addresses PBA may be defined by the controller.

2 Claims, 13 Drawing Sheets

FIG. 11

| VIRTUAL BLOCK ADDRESS VBA | PHYSICAL BLOCK ADDRESS PBA |
|---|---|
| 0 0000 0000 0000 | 0 0100 0000 0011 |
| 0 0000 0000 0001 | 0 1000 0000 1111 |
| 0 0000 0000 0010 | 0 0000 1100 0101 |
| 0 0000 0000 0011 | 0 0011 1100 1010 |
| 0 0000 0000 0100 | 1 1000 0000 0100 |
| 0 0000 0000 0101 | 1 0000 0010 1010 |
| 0 0000 0000 0110 | 0 0100 1100 1111 |
| 0 0000 0000 0111 | 0 0100 0000 0001 |
| 0 0000 0000 1000 | 0 0010 1000 1001 |
| 0 0000 0000 1001 | 1 0100 0000 1000 |
| 0 0000 0000 1010 | 0 0001 1110 0100 |
| 0 0000 0000 1011 | 0 0000 1110 0001 |
| 0 0000 0000 1100 | 0 0011 0001 0101 |
| ⋮ | ⋮ |
| 1 1111 1111 1100 | 0 0000 0000 1001 |
| 1 1111 1111 1101 | 0 0000 0011 0000 |
| 1 1111 1111 1110 | 0 0010 1000 0100 |
| 1 1111 1111 1111 | 0 0000 0001 0100 |

FIG. 12

| Zone | Address |
|---|---|
| ZONE #0 ⇐ | 0 0100 0000 0001 |
| ZONE #1 ⇐ | 0 0100 0000 0111 |
| ZONE #2 ⇐ | 0 0100 0000 1010 |
| ZONE #0 ⇐ | 0 0100 0001 1000 |
| ZONE #7 ⇐ | 0 0100 0001 1111 |
| ZONE #5 ⇐ | 0 0100 0010 1100 |
| ZONE #6 ⇐ | 0 0100 0010 1111 |
| ZONE #7 ⇐ | 0 0100 0101 0000 |
| ZONE #2 ⇐ | 0 0100 0101 0101 |
| ZONE #4 ⇐ | 0 0100 0101 1111 |
| ⋮ | ⋮ |
| ZONE #5 ⇐ | 1 1100 0000 0110 |
| ZONE #3 ⇐ | 1 1100 0100 0001 |
| ZONE #6 ⇐ | 1 1100 1100 0001 |

} DEFECTIVE BLOCK

FIG.16A

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| 0 | 1 | 0 | 0 | 0 | 0 | 0 | 0 |
| ⋮ | ⋮ | ⋮ | ⋮ | ⋮ | ⋮ | ⋮ | ⋮ |
| 0 | 0 | 0 | 0 | 0 | 0 | 0 | 0 |
| 0 | 1 | 0 | 0 | 0 | 0 | 0 | 0 |

| 0 | 0 | 0 | 0 | 0 | 0 | 0 | 0 |
|---|---|---|---|---|---|---|---|
| 0 | 0 | 0 | 0 | 0 | 0 | 0 | 0 |
| 0 | 0 | 0 | 0 | 0 | 0 | 0 | 0 |
| 0 | 0 | 0 | 0 | 1 | 0 | 0 | 0 |
| 0 | 0 | 0 | 0 | 0 | 0 | 0 | 0 |
| 0 | 1 | 0 | 0 | 0 | 0 | 0 | 0 |
| ⋮ | ⋮ | ⋮ | ⋮ | ⋮ | ⋮ | ⋮ | ⋮ |
| 0 | 0 | 0 | 0 | 0 | 0 | 0 | 0 |
| 0 | 1 | 0 | 0 | 0 | 0 | 0 | 0 |

40

MEMORY CONTROLLER, FLASH MEMORY SYSTEM, AND METHOD OF CONTROLLING OPERATION FOR DATA EXCHANGE BETWEEN HOST SYSTEM AND FLASH MEMORY

BACKGROUND OF THE INVENTION

1. Field of the Invention

The present invention relates to a flash memory controller, a flash memory system having the controller, and a method of controlling an operation for data exchange between a host system and a flash memory.

2. Description of the Related Art

Recently, a flash memory is widely employed as a semiconductor memory used in a memory system such as a memory card and a silicon disk. The flash memory is one type of non-volatile memories. It is required that the data stored in the flash memory be retained in the flash memory even when electricity is not supplied to the flash memory.

A NAND type flash memory is one type of flash memories often used in the aforementioned memory system. Each of a plurality of memory cells included in a NAND type flash memory can be changed from an erase state where data representing a logical value "1" is stored, to a write state where data representing a logical value "0" is stored, independently from the other memory cells. On the contrary, in a case where at least one of the plurality of memory cells needs to be changed from the write state to the erase state, each memory cell can not be changed independently from the other memory cell. In this case, all of a predetermined number of memory cells which are collectively referred to as a block need to be changed to the erase state. This simultaneous erasing operation is generally referred to as "block erasing". The block on which the block erasing has been performed is referred to as an erased block.

Due to the above-described characteristic, overwriting of data is not available in the NAND type flash memory. In order to rewrite data stored in a memory cell, block data including new data needs to be written in an erased block first, and then block erasing needs to be performed on the block storing the old data. The rewritten data is stored in a block which is different from the block in which the data before being rewritten was stored. Therefore, the correspondence between a logical block address specified by an address signal supplied from a host system and a physical block address representing the actual block address in the flash memory is dynamically adjusted by a controller each time data is rewritten in the flash memory. For example, the correspondence between the logical block address and the physical block address is described in an address translation table prepared in the controller.

If the correspondence between the logical block addresses and the physical block addresses of all the blocks included in the flash memory is described in an address translation table, the address translation table has to have a large size in accordance with the flash memory having a large data capacity. In order to generate an address translation table having a large size, a large system resource and a long process time are consumed. To solve this problem, Unexamined Japanese Patent Application KOKAI Publication No. 2000-284996 discloses a technique for dividing a memory space in the flash memory into a plurality of zones, and generating an address translation table for the blocks assigned to each zone. Unexamined Japanese Patent Application KOKAI Publication No. 2002-73409 discloses an address translation method for preventing an increase in the memory capacity that is required for using the address translation table, by copying a part of the address translation table stored in the flash memory to a memory space in a RAM. Unexamined Japanese Patent Application KOKAI Publication No. 2003-15946 discloses a memory controller which can perform a series of data writing operations in a flash memory parallely. The memory controller disclosed in this publication is designed to use a plurality of virtual blocks which are formed by virtually combining a plurality of physical blocks belonging to different blocks from each other.

In such a flash memory as disclosed in Unexamined Japanese Patent Application KOKAI Publication No. 2000-284996 having a memory space which is divided into a plurality of zones, existence of a defective block should be taken into consideration for assigning the zones to data areas included in a host system. In other words, it is preferred that the storage capacity of a zone to be assigned to a data area in a predetermined range included in the host system is designed larger than the upper limit of the amount of data to be handled in the data area. At this time, at least one spare block (redundant block) is provided in each zone, such that the ratio of the spare block to all the blocks in the zone is a predetermined value.

However, if many defective blocks exist in one part of a flash memory, the defective blocks concentrate in a zone to which this part is assigned. In a case where the number of defective blocks included in a zone is larger than the number of spare blocks included in this zone, no erased block can be secured and the operation is forced to stop. In a case where many defective blocks concentrate in a specific zone as described above, even though the total number of defective blocks in the flash memory does not exceed the tolerable number for the proper operation, there might be caused a zone that can not store data properly.

SUMMARY OF THE INVENTION

An object of the present invention is to suppress occurrence of an error in a flash memory, in a case where many defective blocks exist in one part of the flash memory.

A memory controller according to a first aspect of the present invention comprises:

a managing module which is so constituted as to manage a correspondence between a virtual address space of a flash memory which is divided into a plurality of zones each including a predetermined number of blocks, and a logical address space in a host system; and a classification controlling module which determines blocks to be classified into each of the plurality of zones, by managing a correspondence between virtual addresses and physical addresses of blocks to be classified into each of the plurality of zones.

The classification controlling module may have in advance a plurality of association tables for associating virtual addresses of blocks to be classified into each of the plurality of zones with physical addresses in the flash memory, and may determine blocks to be classified into each of the plurality of zones, by referring to one of the plurality of association tables.

The classification controlling module may select one of the plurality of association tables so as to minimize a maximum number of defective blocks to be classified into each of the plurality of zones, and may determine blocks to be classified into each of the plurality of zones, by referring to the selected association table.

The classification controlling module may have in advance a function for generating a one-to-one mapping, so as to associate virtual addresses of blocks to be classified into each of the plurality of zones with physical addresses in the flash memory, and may determine blocks to be classified into each of the plurality of zones, by using the function.

The function may have a predetermined mapping cycle.

The classification controlling module may determine blocks to be classified into each of the plurality of zones, by setting a number of times conversion by the function is performed.

The function may be a function for generating a tent mapping.

In a case where a recurring cycle of the tent mapping is T, and a total number of blocks to be classified into any of the plurality of zones is N, T and N may satisfy a following relationship $$N=2^{(T-1)}.$$

The classification controlling module may have in advance a plurality of functions for associating virtual addresses of blocks to be classified into each of the plurality of zones with physical addresses in the flash memory, and may determine blocks to be classified into each of the plurality of zones, by using one of the plurality of functions.

The classification controlling module may select one of the plurality of functions, so as to minimize a maximum number of defective blocks to be classified into each of the plurality of zones, and may determine blocks to be classified into each of the plurality of zones by using the selected function.

The memory controller may further comprise a main processor which supplies a logical address of a block to the managing module in order to request an access to the flash memory.

A flash memory system according to a second aspect of the present invention comprises:

a non-volatile flash memory;

a managing module which is so constituted as to manage a correspondence between a virtual address space of the flash memory which is divided into a plurality of zones each including a predetermined number of blocks, and a logical address space in a host system; and a classification managing module which determines blocks to be classified into each of the plurality of zones, by managing a correspondence between virtual addresses and physical addresses of blocks to be classified into each of the plurality of zones.

The classification controlling module may have in advance a plurality of association tables for associating virtual addresses of blocks to be classified into each of the plurality of zones with physical addresses in the flash memory, and may determine blocks to be classified into each of the plurality of zones, by referring to one of the plurality of association tables.

The classification controlling module may select one of the plurality of association tables so as to minimize a maximum number of defective blocks to be classified into each of the plurality of zones, and may determine blocks to be classified into each of the plurality of zones, by referring to the selected association table.

The classification controlling module may have in advance a function for generating a one-to-one mapping, so as to associate virtual addresses of blocks to be classified into each of the plurality of zones with physical addresses in the flash memory, and may determine blocks to be classified into each of the plurality of zones, by using the function.

The function may have a predetermined mapping cycle.

The classification controlling module may determine blocks to be classified into each of the plurality of zones, by setting a number of times conversion by the function is performed.

The function may be a function for generating a tent mapping.

In a case where a recurring cycle of the tent mapping is T, and a total number of blocks to be classified into any of the plurality of zones is N, T and N may satisfy a following relationship $$N=2^{(T-1)}.$$

The classification controlling module may have in advance a plurality of functions for associating virtual addresses of blocks to be classified into each of the plurality of zones with physical addresses in the flash memory, and may determine blocks to be classified into each of the plurality of zones, by using one of the plurality of functions.

The classification controlling module may select one of the plurality of functions, so as to minimize a maximum number of defective blocks to be classified into each of the plurality of zones, and may determine blocks to be classified into each of the plurality of zones by using the selected function.

A method according to a third aspect of the present invention is a method of controlling an operation for exchanging data between a host system and a flash memory, and comprises:

managing a correspondence between a virtual address space of the flash memory which is divided into a plurality of zones each including a predetermined number of blocks, and a logical address space in the host system; and determining blocks to be classified into each of the plurality of zones, by managing a correspondence between virtual addresses and physical addresses of blocks to be classified into each of the plurality of zones.

The method may have in advance a plurality of association tables for associating virtual addresses of blocks to be classified into each of the plurality of zones with physical addresses in the flash memory, and may determine blocks to be classified into each of the plurality of zones, by referring to one of the plurality of association tables.

The method may have in advance a function for generating a one-to-one mapping, so as to associate virtual addresses of blocks to be classified into each of the plurality of zones with physical addresses in the flash memory, and may determine blocks to be classified into each of the plurality of zones, by using the function.

BRIEF DESCRIPTION OF THE DRAWINGS

These objects and other objects and advantages of the present invention will become more apparent upon reading of the following detailed description and the accompanying drawings in which:

FIG. 11 is a schematic diagram showing an example of how a replacement table is constituted;

FIG. 12 is a schematic diagram showing an example of a list of defective blocks;

FIG. 16 are schematic diagrams showing an example of a search table.

DETAILED DESCRIPTION OF THE PREFERRED EMBODIMENT

Figure 1:
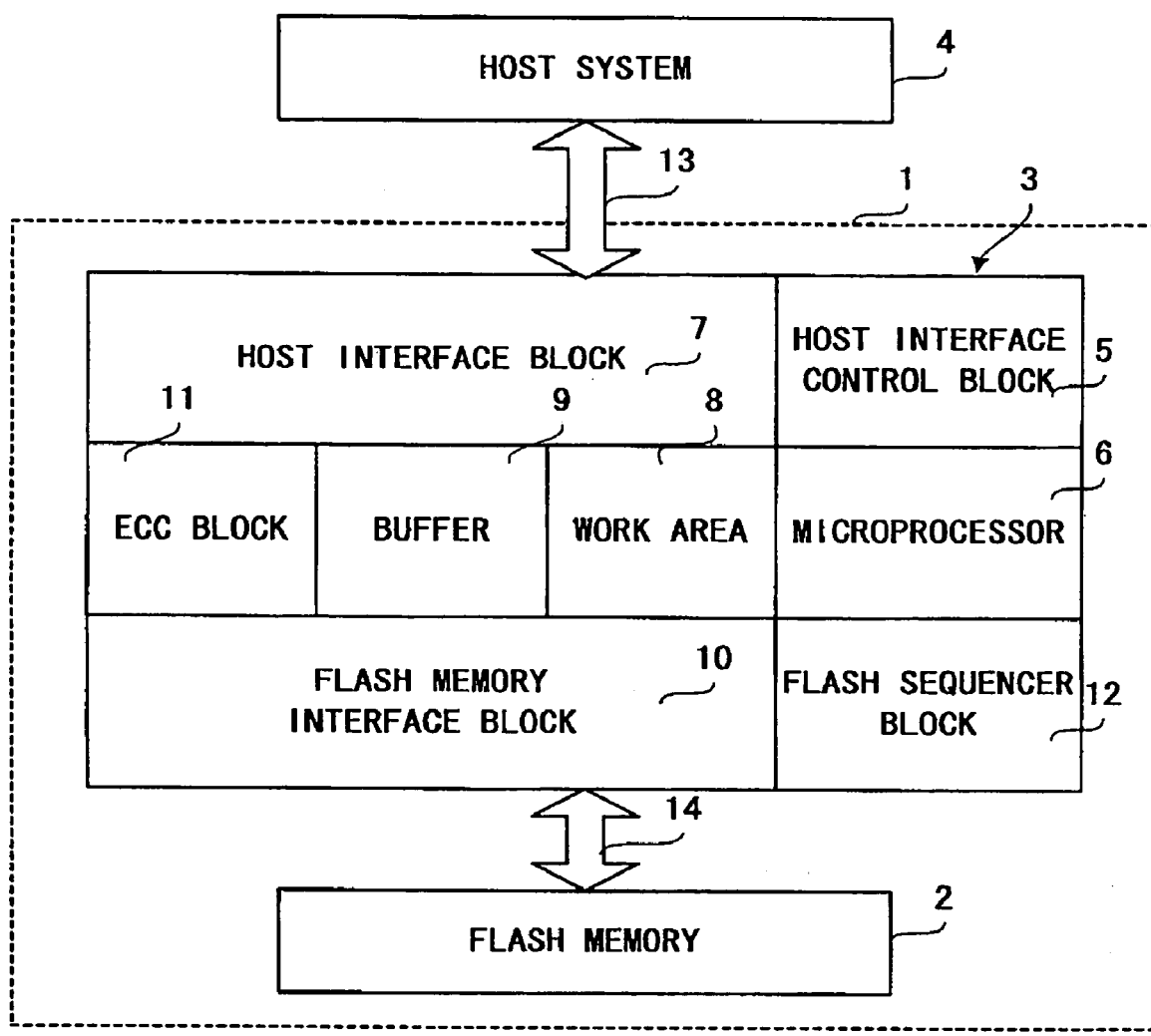
FIG. 1 is a block diagram of a flash memory system according to the present invention.

FIG. 1 is a block diagram schematically showing a flash memory system 1 according to the present invention. The flash memory system 1 comprises a flash memory 2 and a controller 3. The flash memory system 1 can be attached to a memory interface owned by a host system 4. The host system 4 can activate the flash memory system 1 as an external storage device, by the flash memory system 1 being attached thereto.

The host system 4 may be an information processing system represented by a personal computer and a digital camera, for processing various information such as character information, audio information, image information, etc. For example, the host system 4 may include a main processor such as a CPU (Central Processing Unit).

The flash memory 2 shown in FIG. 1 is a non-volatile memory. A data reading operation and a data writing operation are both executed on the flash memory 2 in a so-called page unit, while data stored in the flash memory 2 is erased in a so-called block unit. One block includes, for example, 32 pages. One page includes a data area 25 (shown in FIG. 4) having 512 bytes, and a redundant area 26 (shown in FIG. 4) having 16 bytes.

In FIG. 1, the controller 3 comprises a host interface control block 5, a microprocessor 6, a host interface block 7, a work area 8, a buffer 9, a flash memory interface block 10, an ECC block 11, and a flash sequencer block 12. For example, the controller 3 is integrated on a single semiconductor chip. The function of each component of the controller 3 will hereinafter be described.

The host interface control block 5 is a functional block for controlling the operation of the host interface block 7. The host interface control block 5 includes a plurality of registers (not shown). The host interface control block 5 controls the operation of the host interface block based on information set in each register.

The microprocessor 6 is a functional block for controlling the operation of the entire controller 3.

The host interface block 7 is a functional block for exchanging information representing data, an address, a status, an external command, etc. with the host system 4, under the control of the microprocessor 6. When the flash memory system 1 is attached to the host system 4, the flash memory system 1 and the host system 4 are connected to each other via an external bus 13. Information supplied from the host system 4 to the flash memory system 1 is acquired into inside of the controller 3 via the host interface block 7. Information supplied from the flash memory system 1 to the host system 4 is output to the host system 4 via the host interface block 7.

The work area 8 is a memory module for temporarily storing data used for controlling the flash memory 2. For example, the work area 8 includes a plurality of SRAM (Static Random Access Memory) cells.

The buffer 9 is a functional block for retaining data read from the flash memory 2 and data to be written into the flash memory 2. Data read from the flash memory 2 is retained in the buffer 9 until it is output to the host system 4. Data to be written into the flash memory 2 is retained in the buffer 9 until the flash memory 2 is prepared for the data writing operation.

The flash memory interface block 10 is a functional block for exchanging information representing data, an address, a status, an internal command, etc. with the flash memory 2 via an internal bus 14. An internal command is a command to be fed from the controller 3 to the flash memory 2, and is distinguished from an external command to be fed from the host system 4 to the flash memory system 1.

The ECC block 11 is a functional block for generating an error correction code to be added to data to be written into the flash memory 2. In addition, the ECC block 11 detects and corrects any error included in data read out from the flash memory 2, based on an error correction code included in the read data.

The flash sequencer block 12 is a functional block for controlling the operation of the flash memory based on an internal command. The flash sequencer block 12 includes a plurality of registers (not shown). The flash sequencer block 12 sets information to be used for executing an internal command in the plurality of registers under the control of the microprocessor 6. After setting information in the plurality of registers, the flash sequencer block 12 performs an operation corresponding to an internal command, based on the information set in each register. In addition, the flash sequencer block 12 performs a dispersion process for dispersing a plurality of blocks assigned to one zone in the flash memory 2.

Figure 2:
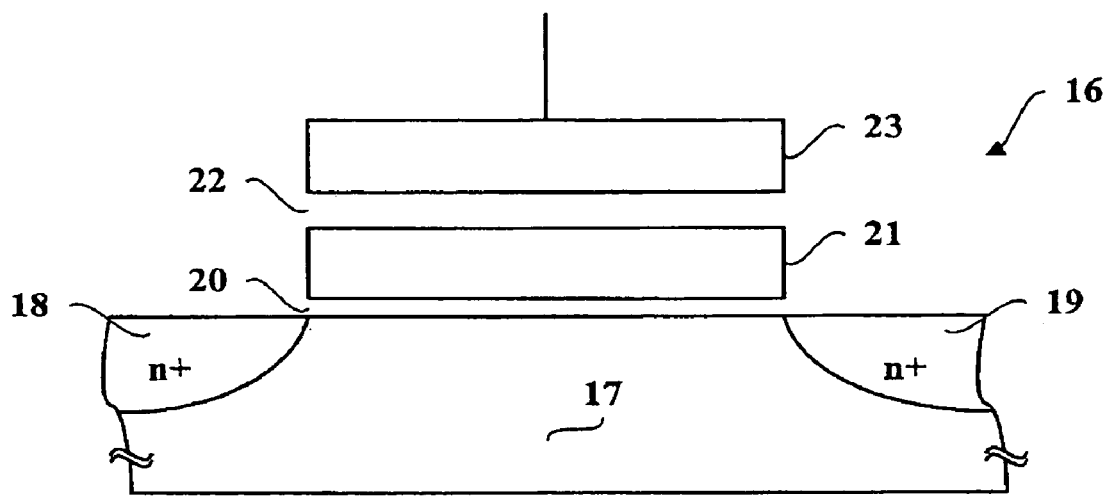
FIG. 2 is a cross sectional view schematically showing a structure of a memory cell.
Figure 3:
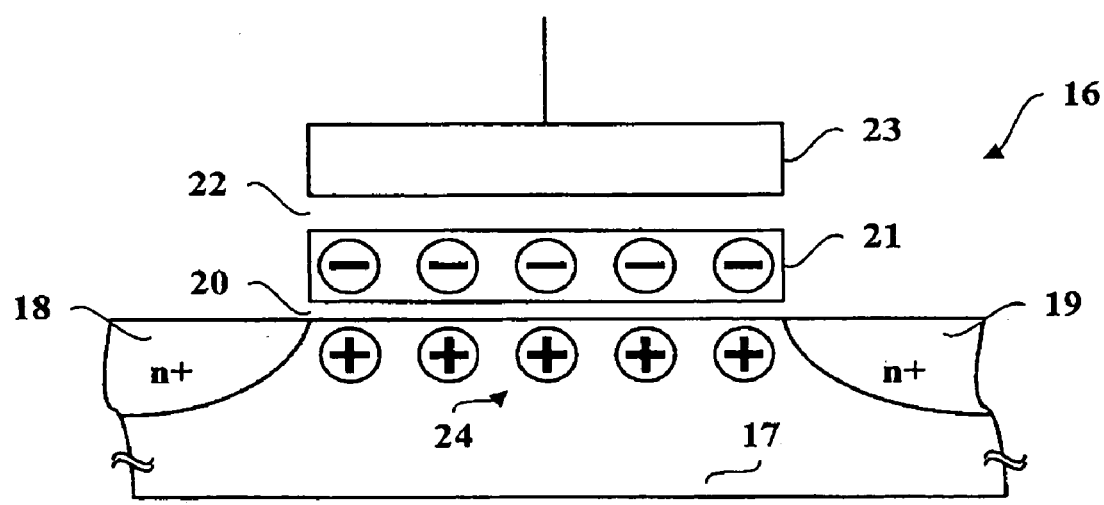
FIG. 3 is a cross sectional view showing a memory cell in a write state.

With reference to FIG. 2 and FIG. 3, the structure of a memory cell 16 included in the flash memory 2 will be explained. FIG. 2 and FIG. 3 are cross sectional views schematically showing the structure of one memory cell 16 included in the flash memory 2. In FIG. 2, no data is written in the memory cell 16. In FIG. 3, data is written in the memory cell 16.

As shown in FIG. 2 and FIG. 3, the memory cell 16 includes a P type semiconductor substrate 17, an N type source diffusion region 18, an N type drain diffusion region 19, a tunnel oxide film 20, a floating gate electrode 21, an insulation film 22, and a control gate electrode 23. The source diffusion region 18 and the drain diffusion region 19 are both formed on the P type semiconductor substrate 17. The tunnel oxide film 20 covers the P type semiconductor substrate 17 between the source diffusion region 18 and the drain diffusion region 19. The floating gate electrode 21 is formed on the tunnel oxide film 20. The insulation film 22 is formed on the floating gate electrode 21. The control gate electrode 23 is formed on the insulation film 22. In the flash memory 2, a plurality of memory cells 16 are connected in series. One memory cell 16 stores data of 1 bit.

When the floating gate electrode 21 is not charged with electrons as shown in FIG. 2, the memory cell 16 is in the erase state. On the other hand, when the floating gate electrode 21 is charged with electrons, the memory cell 16 is in the write state. When in the erase state, the memory cell 16 stores data representing a logical value "1". When in the write state, the memory cell 16 stores data representing a logical value "0".

When a predetermined reading voltage for reading data stored in the memory cell 16 is not applied to the control gate electrode 23 of the memory cell 16 in the erase state, no channel is formed on the surface of the P type semiconductor substrate 17 between the source diffusion region 18 and the drain diffusion region 19. Thus, the source diffusion region 18 and the drain diffusion region 19 are electrically insulated from each other.

On the contrary, when a reading voltage is applied to the control gate electrode 23 of the memory cell 16 in the erase state, a channel (not shown) is formed on the surface of the P type semiconductor substrate 17 between the source diffusion region 18 and the drain diffusion region 19. The source diffusion region 18 and the drain diffusion region 19 are electrically connected to each other via the channel.

As described above when a reading voltage is not applied to the control gate electrode 23 of the memory cell 16 in the erase state, the source diffusion region 18 and the drain diffusion region 19 are electrically insulated. And when a reading voltage is applied to the control gate electrode 23 of the memory cell 16 in the erase state, the source diffusion region 18 and the drain diffusion region 19 are electrically connected.

When the floating gate electrode 21 is charged with electrons as shown in FIG. 3, the memory cell 16 is in the write state. The floating gate electrode 21 is sandwiched between the tunnel oxide film 20 and the insulation film 22. Because of this, once electrons are injected into the floating gate electrode 21, the electrons remain inside the floating gate electrode 21 for quite a long time due to a potential barrier. In the memory cell 16 which is in the write state due to the floating gate electrode 21 being charged with electrons, a channel 24 is formed on the surface of the P type semiconductor substrate 17 between the source diffusion region 18 and the drain diffusion region 19, irrespective of whether a reading voltage is applied to the control gate electrode 23. Thus, when the memory cell 16 is in the write state, the source diffusion region 18 and the drain diffusion region 19 are electrically connected to each other irrespective of whether a reading voltage is applied to the control gate electrode 23.

A data reading operation for specifying whether the memory cell 16 is in the erase state or in the write state will be explained below. In the flash memory 2, the plurality of memory cells 16 are connected in series. One of the plurality of memory cells 16 is selected by the controller 3 for reading the data stored therein. A predetermined low level voltage is applied to the control gate electrode 23 attached to the selected one memory cell 16. A predetermined high level voltage (reading voltage) which is higher than the low level voltage is applied to the control gate electrode 23 attached to another memory cell 16 in the plurality of memory cells 16. In this state, a predetermined detector detects whether the series of memory cells 16 are electrically continuous. If the detector detects an electrically continuous state, the selected memory cell 16 is in the write state. If the detector detects an electrically discontinuous state, the selected memory cell 16 is in the erase state. As described above, the flash memory 2 is designed such that stored data representing a logical value "0" or a logical value "1" is read from an arbitrary one of the plurality of memory cells 16 connected in series.

For changing the state of the memory cell 16 between the erase state and the write state, an erasing voltage or a writing voltage that is higher than the voltage used for the data reading operation on the memory cell 16 is used. In order to change a memory cell 16 in the erase state to the write state, a writing voltage is applied to the control gate electrode 23 so that the potential of the control gate electrode 23 is higher than the potential of the floating gate electrode 21. Due to this writing voltage, an FN (Fowler-Nordhaim) tunnel current flows between the P type semiconductor substrate 17 and the floating gate electrode 21 via the tunnel oxide film 20. As a result, electrons are injected into the floating gate electrode 21. On the other hand, in order to change a memory cell 16 in the write state to the erase state, an erasing voltage is applied to the control gate electrode 23 so that the potential of the control gate electrode 23 is lower than the potential of the floating gate electrode 21. Due to this erasing voltage, the electrons charged in the floating gate electrode 21 are discharged to the P type semiconductor substrate 17 via the tunnel oxide film 20.

Figure 4:
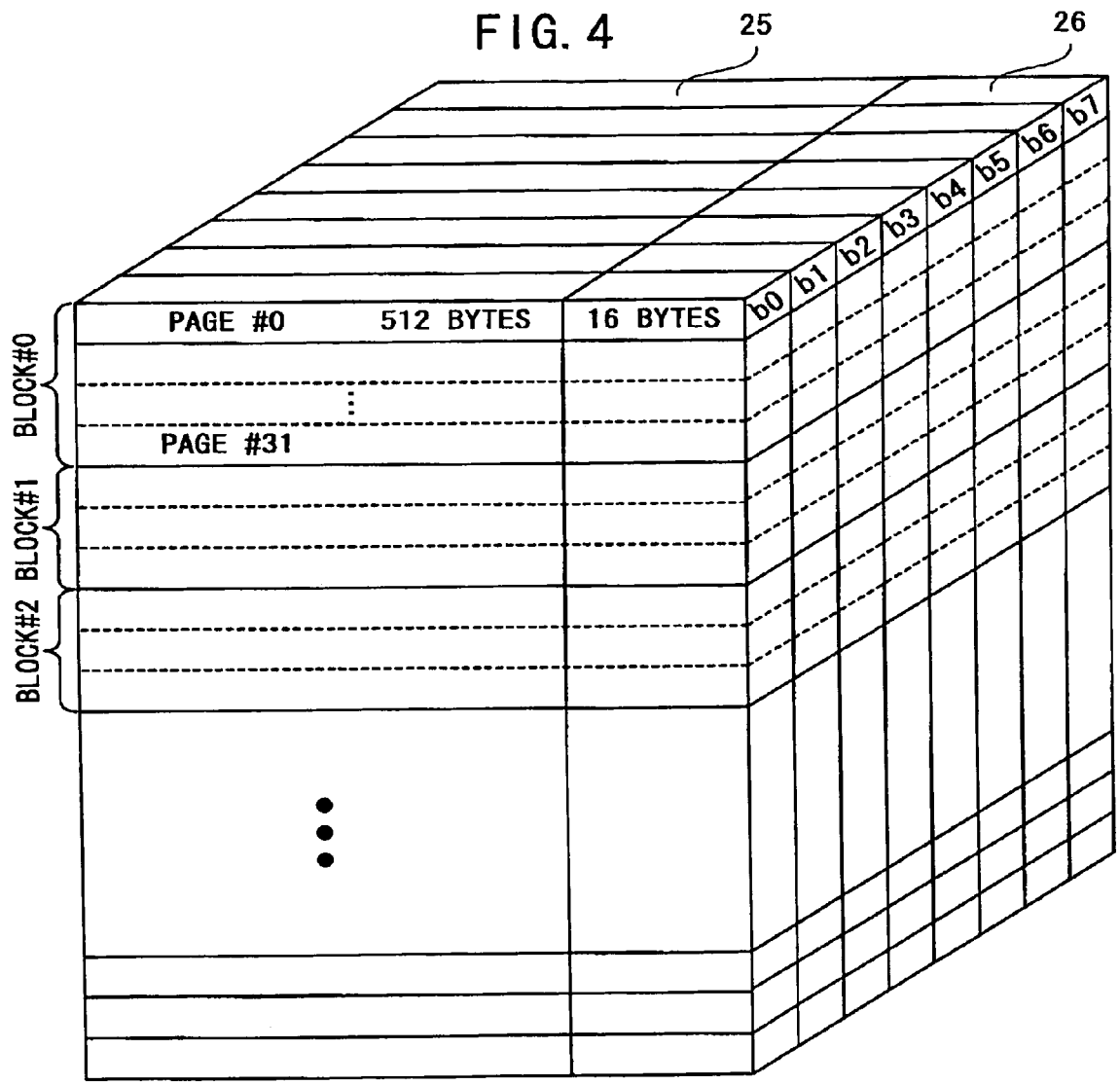
FIG. 4 is a schematic diagram showing an address space in a flash memory.

A structure for storing data in the flash memory 2 will be explained below. FIG. 4 schematically shows an address space of the flash memory 2. In the structure shown in FIG. 4, the address space of the flash memory 2 is divided based on the units of "page" and "block". A page is a process unit for a data reading operation and a data writing operation performed in the flash memory 2. A block is a process unit for a data erasing operation performed in the flash memory 2.

One page includes a data area 25 having 512 bytes and a redundant area 26 having 16 bytes. The data area 25 stores user data supplied from the host system 4. The redundant area 26 stores additional information representing an error correction code (ECC), a corresponding logical block address, a block status, etc. The error correction code is used for correcting an error included in the data stored in the data area 25. If the number of errors included in the data stored in the data area 25 is equal to or smaller than a predetermined threshold, the errors can be corrected by the error correction code. In this case, the data read from the data area 25 is corrected to proper data by the error correction code.

The corresponding logical block address indicates the address of a logical block corresponding to a given block, in a case where this given block includes at least one data area 25 that stores effective data. The logical block address is a block address which is determined based on a host address supplied from the host system 4. On the other hand, an actual block address in the flash memory 2 is referred to as physical block address.

In a case where no effective data is stored in any of the data areas 25 included in one block, no corresponding logical block address is stored in the redundant areas 26 included in the block. Therefore, by determining whether a corresponding logical block address is stored in a redundant area 26 or not, it is possible to determine whether or not data has been erased in the block in which this redundant area 26 is included. When no corresponding logical block address is stored in a redundant area 26, the block in which this redundant area 26 is included is in a state where data has been erased.

The block status shows whether each block is a defective block that can not properly store data. For example, if a given block is a defective block, a block status flag prepared for the block is set to an on state.

In the flash memory 2, the memory cells 16 can not be changed from the write state to the erase state in the cell unit. This state change is available only in the block unit. Therefore, in order to store new data in a given page, block data including the new data has to be written into an erased block first, and then the block erasing has to be performed on the block storing the old data. The block erasing is performed in the block unit. Therefore, in the block including the page that stores the old data, the data stored in all the pages are erased. Accordingly, in order to rewrite stored data in a given page, a process for relocating stored data in the other pages included in the block in which the given page is included to an erased block is required.

The block in which the new data for the rewriting is stored is different from the block storing the old data. Therefore, the correspondence between a logical block address specified by an address signal supplied from the host system 4 and a physical block address representing an actual block address in the flash memory 2 needs to be dynamically adjusted by the controller 3, each time data is rewritten in the flash memory 2. From this aspect, the controller 3 can manage the correspondence between a logical block address and a physical block address, by writing additional information representing a logical block address (corresponding logical block address) in the redundant area 26 in accordance with a data writing operation to the data area 25.

In the address space of the flash memory 2, a plurality of blocks are classified into one of a plurality of zones. An example of assigning the zones of the flash memory 2 to a logical block address space in the host system 4 will now be explained.

Figure 5:
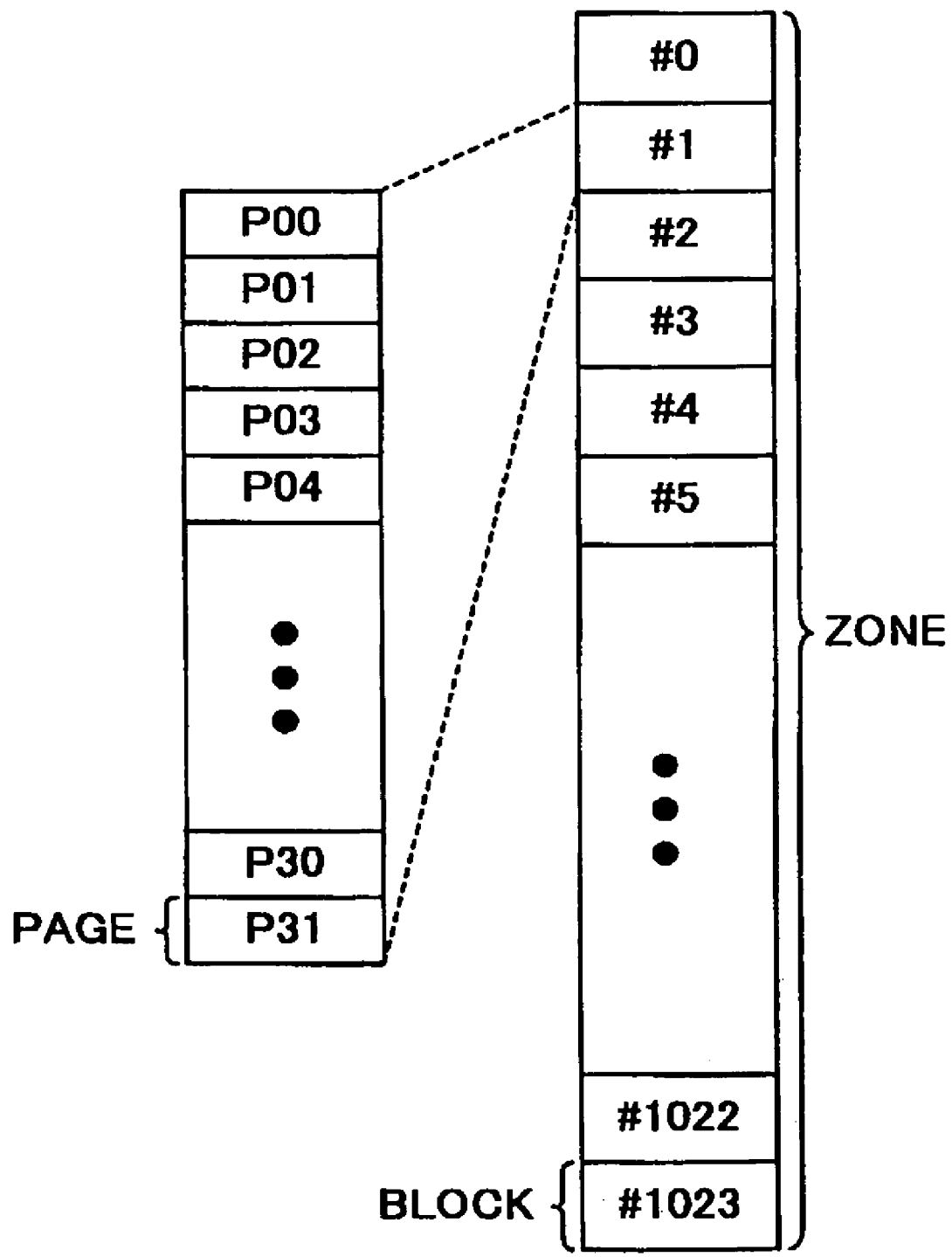
FIG. 5 is a schematic diagram showing how zones are assigned.

In an example shown in FIG. 5, one zone includes 1024 blocks #0 to #1023. Each of the blocks #0 to #1023 includes 32 pages P00 to P31. A block is a process unit for a data erasing operation. A page is a process unit for a data reading operation and a data writing operation. The zone shown in FIG. 5 is assigned to a logical block address space in a predetermined range in the host system 4. For example, the zone including 1024 blocks is assigned to a logical block address space having a data capacity amounting to 1000 blocks. In this example, the storage capacity of one zone is larger than the data capacity of the logical block address space to which the zone is assigned, by a data amount corresponding to 24 blocks. In this assigning manner, defective blocks are taken into consideration. When stored data is rewritten in the flash memory 2, one spare block for writing new data is required. Accordingly, substantially 23 blocks are treated as spare blocks in one zone.

The number of blocks included in one zone may be arbitrarily set based on the usage of the flash memory system 1, the specification of the flash memory 2, or the like.

An example of how the plurality of blocks are classified into the zones will now be explained. The plurality of blocks in the flash memory 2 may be classified into the zones in the order of physical block addresses. However, in this case, many defective blocks might be classified into a specific zone, due to that the defective blocks are overconcentrated in one part of the flash memory 2. In the flash memory system 1 according to the present invention, a plurality of blocks included in one zone is dispersedly allocated in the flash memory 2, in order to prevent overconcentration of defective blocks in a specific zone.

Figure 6:
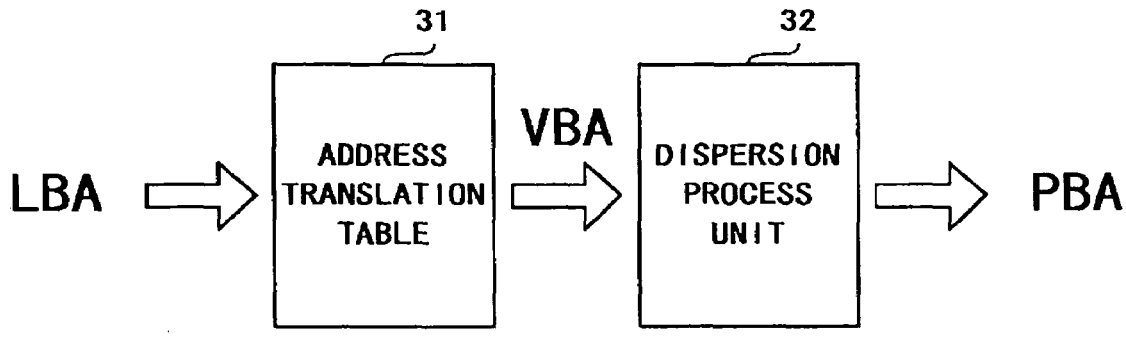
FIG. 6 is a schematic diagram showing a process for classifying blocks.

FIG. 6 is a schematic diagram showing a process for classifying the plurality of blocks included in the flash memory 2 to one of a plurality of zones. In FIG. 6, a logical block address LBA supplied from the host system 4 is translated into a virtual block address VBA based on an address translation table 31. For example, the address translation table 31 is stored in the work area 8, and is referred to by the host interface control block 5. The virtual block address VBA is associated with a physical block address PBA by a dispersion process unit 32. For example, it is preferred that the flash sequencer block 12 functions as the dispersion process unit 32 shown in FIG. 6 by executing a predetermined program.

A virtual block address VBA is obtained by adding a serial number assigned to each of the plurality of blocks included in one zone to an offset value prepared for the zone. In the example shown in FIG. 7, 1024 blocks are classified into one zone. Thus, in one zone, serial numbers of "0" to "1023" are assigned to the respective blocks. The offset value for the respective zones are as shown below.

Zone #0: 0,
Zone #1: 1024×1,
Zone #2: 1024×2,
- - -
Zone #N: 1024×N.

In a virtual block address space, all the blocks in the flash memory 2 are allocated such that the virtual block address VBA increments by one. In a case where the serial number of the block and the virtual block address VBA are described in a bit data (binary data) format, the virtual block address VBA is obtained by inserting a zone number (binary data) assigned to each zone to higher-order bits than bits for the serial number of the block. In a case where each of the zones #0 to #7 includes 1024 blocks, the serial numbers of the blocks are represented by 10-bit data (from "00 0000 0000" to "11 1111 1111"). 3-bit data (from "000" to "111") is assigned to the eight zones #0 to #7 as t zone number. In this case, by inserting the zone number to higher-order bits than bits for the serial number of the block, a virtual block address VBA of 13 bits is generated. For example, the virtual block address VBA of the block having a serial number "16" ("00 0001 0000" in the binary notation) in the zone #4 having a zone number "100" is "1 0000 0001 0000" in the binary notation. The dispersion process unit 32 refers to a function or a table prepared in advance, in order to associate the virtual block address VBA with a physical block address PBA.

Figure 7:
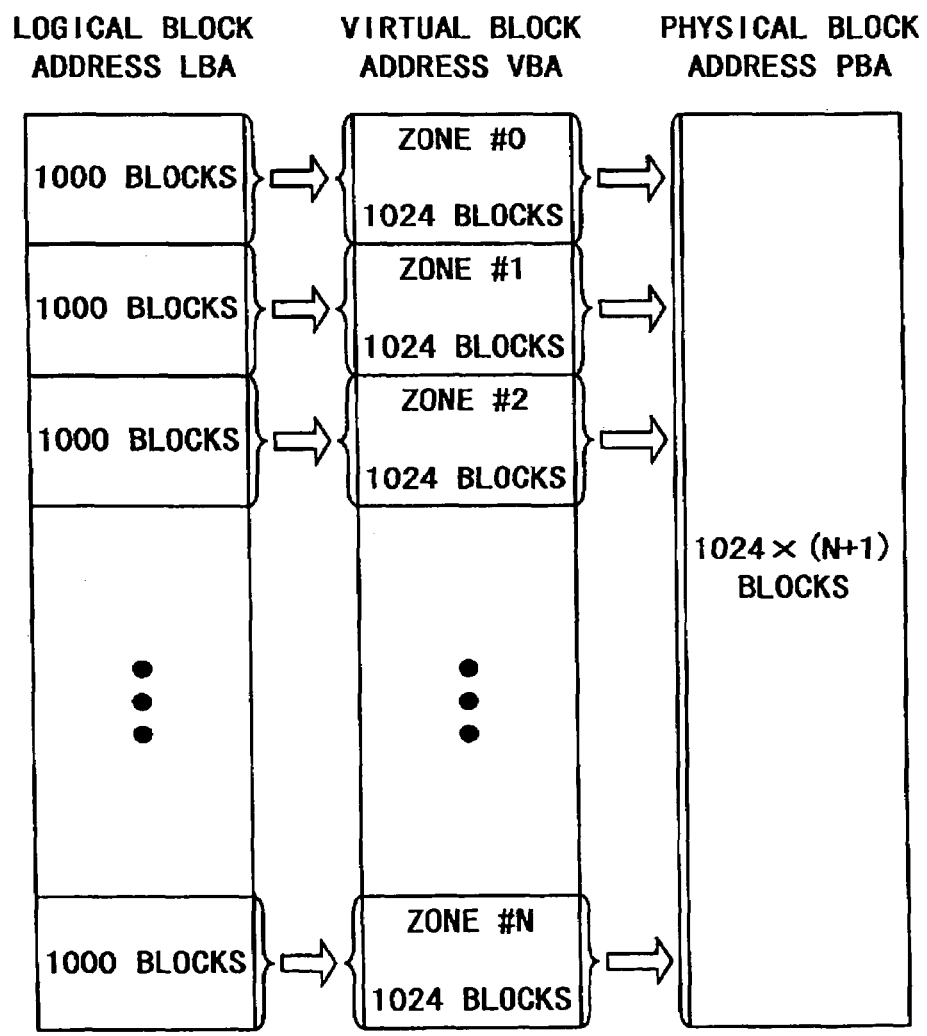
FIG. 7 is a schematic diagram showing one example of a correlation among logical block addresses, virtual block addresses, and physical block addresses.

FIG. 7 shows a correlation among the logical block address LBA, the virtual block address VBA, and the physical block address PBA In FIG. 7, a plurality of logical block address spaces each including 1000 blocks are assigned to a plurality of zones #0 to #N each including 1024 blocks, respectively. The minimum value of the virtual block address VBA in a zone #K is larger by 1 than the maximum value of the virtual block address VBA in a zone #(K−1) (1≦K≦N). By this setting of the virtual block address VBA, in the virtual block address space, arbitrary two zones adjacent to each other in the zones #0 to #N are combined via the virtual block address VBA. The virtual block address VBA is associated with the physical block address PBA by the dispersion process unit 32 in accordance with the setting of the function or the table prepared in advance. The function or the table referred to by the dispersion process unit 32 should be set in such a manner as to classify a plurality of blocks having physical block addresses PBA which are greatly different from each other into one of the zones #0 to #7. As a result, zones each including 1024 blocks which are dispersedly allocated in the flash memory 2 can be assigned to logical block address spaces each including 1000 blocks.

The dispersion process performed by the dispersion process unit 32 will now be explained below. By performing the dispersion process, a plurality of blocks dispersedly allocated in the flash memory 2 are classified into one of the plurality of zones. In this dispersion process, the dispersion process unit 32 associates the virtual block address VBA with the physical block address PBA. In order to perform the dispersion process, the dispersion process unit 32 uses an address register 33 and a process setting register 34 shown in FIG. 8. For example, the address register 33 and the process setting register 34 may be included in the flash sequencer block 12.

The virtual block address VBA is included in each of a plurality of virtual page address assigned to the plurality of pages in the virtual address space in the flash memory 2. A virtual page address includes a virtual block address VBA and a page number of 5 bits. The page number having 5 bits is used for identifying each of 32 pages included in one block. The address register 33 temporarily stores the virtual page addresses. The process setting register 34 stores information representing the correspondence between the virtual block address VBA and the physical block address PBA.

The dispersion process unit 32 reads the virtual block address VBA included in the virtual page address stored in the address register 33. Then, the dispersion process unit 32 replaces the virtual block address VBA stored in the address register 33 with a physical block address PBA based on the information stored in the process setting register 34. A physical page address is generated by adding the page number included in the virtual page address stored in the address register 33 to the physical block address PBA generated by the dispersion process unit 32. The generated physical page address is provided to a memory space 35 of the flash memory 2.

Figure 9:
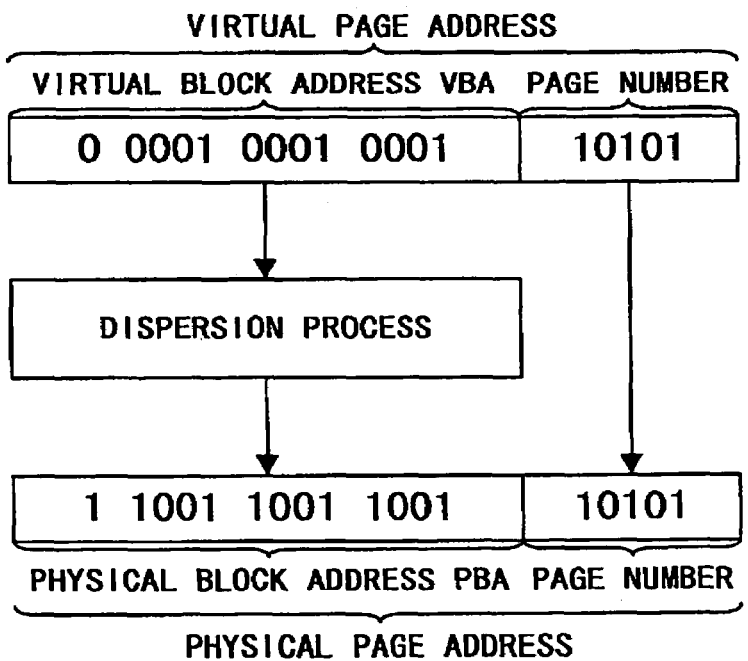
FIG. 9 is a schematic diagram showing an operation for converting a virtual page address into a physical page address.

FIG. 9 shows an operation for generating a physical page address based on a virtual page address stored in the address register 33. The virtual page address shown in FIG. 9 is divided into lowest-order 5-bit data representing the page number, and highest-order 13-bit data representing the virtual block address VBA. The dispersion process unit 32 replaces the highest-order 13-bit data representing the virtual block address VBA with another 13-bit data representing the physical block address PBA. In the example shown in FIG. 9, the highest-order 13-bit data included in the virtual page address represents "0 0001 0001 0001" as the virtual block address VBA. "0 0001 0001 0001" is replaced with "1 1001 1001 1001" as the physical block address PBA by the dispersion process unit 32. In the dispersion process performed by the dispersion process unit 32, the bit data representing the virtual block address VBA is replaced with bit data representing a physical block address PBA, but the 5-bit data representing the page number is not changed. The number of bits representing the virtual block address VBA in the virtual page address is determined in accordance with the number of blocks provided in the flash memory 2. The number of bits representing the page number in the virtual page address is determined in accordance with the number of pages included in one block. For example, in a case where the memory space in the flash memory 2 is divided into 8192 blocks and each block includes 32 pages, the virtual block address VBA is identified by 13-bit data and the page number is identified by 5-bit data.

Figure 10:
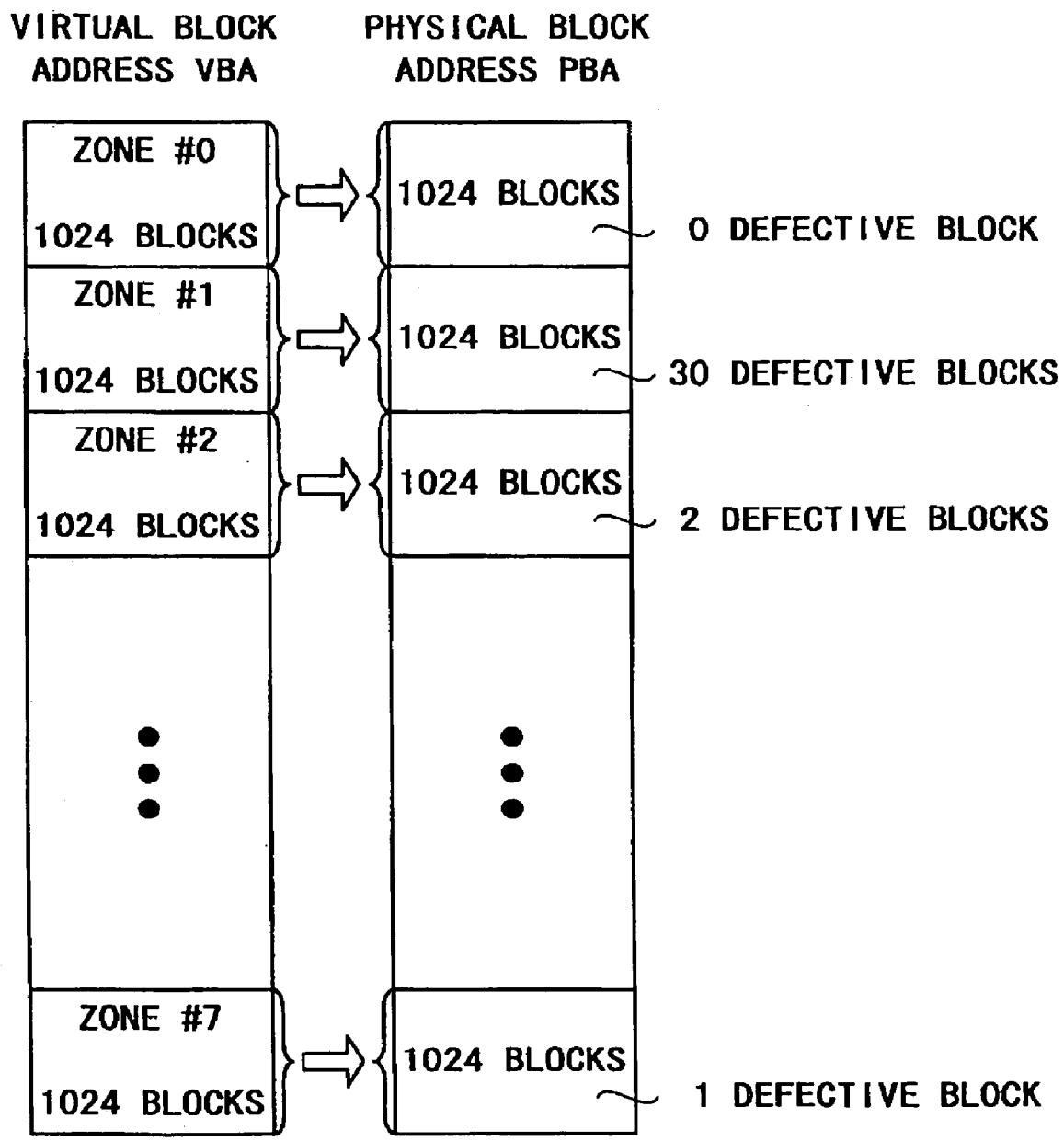
FIG. 10 is a schematic diagram showing a case where a virtual block address is directly assigned to a physical block address.

Next, a process for setting the correspondence between the virtual block address VBA and the physical block address PBA will be explained. FIG. 10 shows the correspondence between the virtual block address VBA and the physical block address PBA of a case where the virtual block address VBA is directly assigned to the physical block address PBA. In the example shown in FIG. 10, the dispersion process unit 32 does not perform the dispersion process. In this case, the physical block address PBA owned by each block in the flash memory 2 coincides with the virtual block address VBA. Therefore, the zones #0 to #7 in the virtual address space are assigned to a plurality of physical areas in the flash memory 2 respectively in accordance with the physical block addresses PBA. In this case, for example, if 30 defective blocks are included in a memory area including 1024 memory cells 16 to which "0 0100 0000 0000 (1024)" to "0 0111 1111 1111 (2047)" are assigned as physical block addresses PBA, the 30 defective blocks are classified into the zone #1. In this case, it can not be ensured that all the data supplied to a logical block address space in the host system 4 that corresponds to the zone #1 are properly stored in the flash memory 2. If the defective blocks are eliminated from effective blocks used for storing data, the blocks used as effective blocks in the zone #1 are short. If a defective block is assigned to a part of the logical block address space, the data that the host system 4 supplies to this part can not be properly stored in the flash memory 2. The flash memory system 1 according to the present invention sets the correspondence between the virtual block address VBA and the physical block address PBA in a manner that the number of defective blocks to be classified into each of the plurality of zones is averaged.

For example, the flash memory system 1 has a plurality of replacement tables describing the correspondence between virtual block addresses VBA and physical block addresses PBA. The plurality of replacement tables may be pre-stored in a ROM (Read Only Memory) for storing fixed data and programs in the controller 3. Or, the plurality of replacement tables may be pre-stored in a predetermined storage area in the flash memory 2 and read by the controller 3. FIG. 11 shows an example of a replacement table. The replacement table associates virtual block addresses VBA with physical block addresses PBA. In order to perform the dispersion process, the flash memory system 1 selects one of the replacement tables that minimizes the maximum number of defective blocks to be classified into each zone.

To select one of the plurality of replacement tables, the controller 3 detects all the defective blocks in the flash memory 2, and specifies the virtual block address VBA corresponding to each defective block in accordance with one of the replacement tables. Then, the controller 3 counts the number of defective blocks included in each zone, based on the physical block addresses VBA corresponding to the defective blocks. The controller 3 detects the replacement table that minimizes the maximum number of defective blocks classified into each zone, by referring to the counting result of each replacement table.

In order to specify zones into which defective blocks are classified, the controller 3 searches for the physical block addresses PBA assigned to the defective blocks in the replacement table. When a physical block address PBA assigned to a defective block is detected, the virtual block address VBA associated with the detected physical block address PBA is read from the replacement table. Each set of 1024 virtual block addresses VBA is assigned to one of the plurality of zones. Therefore, one zone is specified for one virtual block address VBA assigned to one defective block.

For example, defective blocks detected by the controller 3 have physical block addresses PBA shown in FIG. 12. "0 0100 0000 0001" indicated at the top as a physical block address PBA of a defective block in the list of defective blocks shown in FIG. 12 is described in the replacement table shown in FIG. 11 in the eighth row from the top in the column indicating the physical block addresses PBA. Accordingly, "0 0000 0000 0111" is specified as the virtual block address VBA of the defective block corresponding to "0 0100 0000 0001" as the physical block address PBA. "0 0100 0000 0001" as the physical block address PBA is included in a virtual address range of "0 0000 0000 0000" to "0 0011 1111 1111" assigned to the zone #0. In this manner, the defective block indicated at the top in FIG. 12 is specified as being classified into the zone #0.

Figure 13:
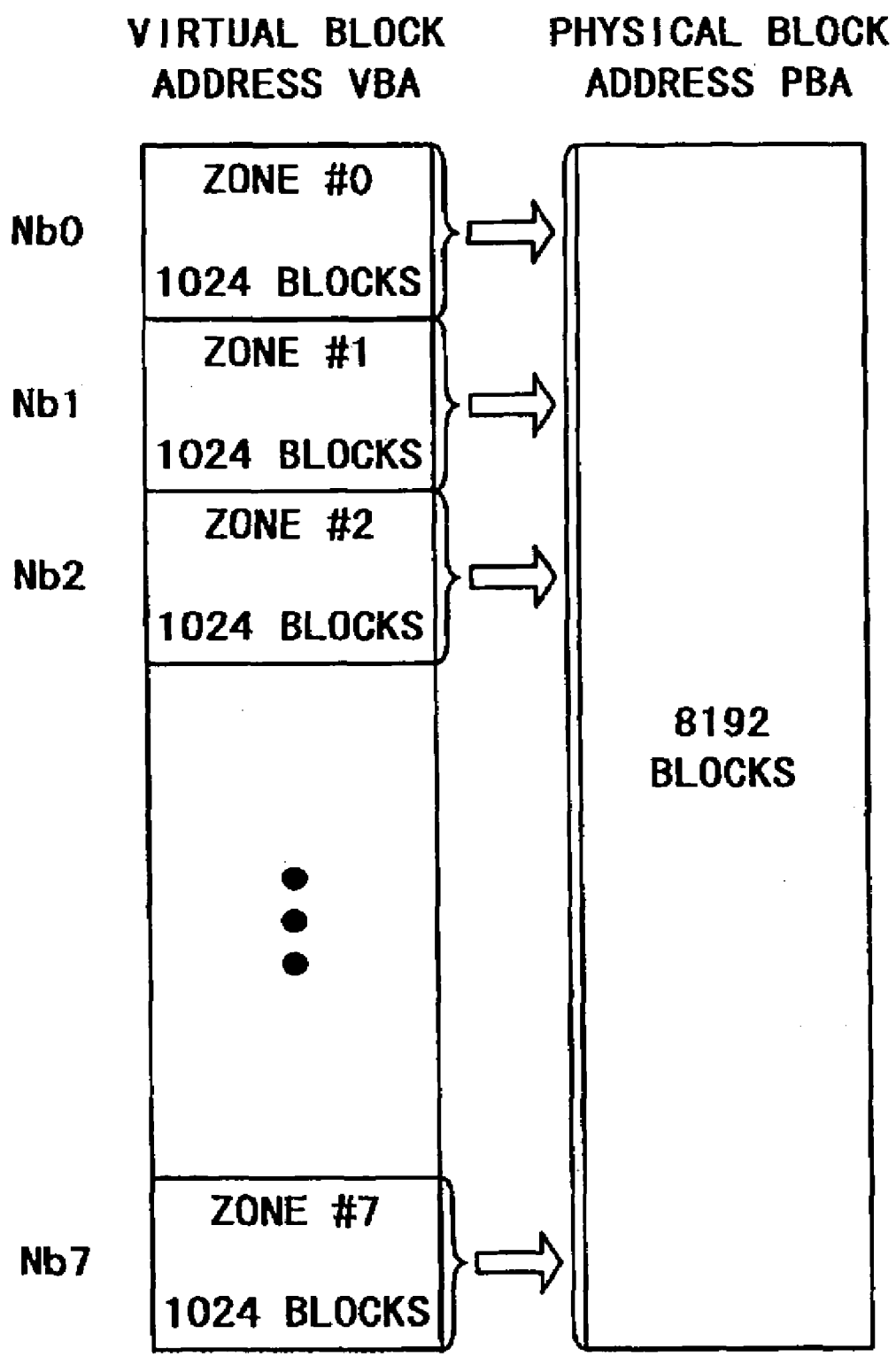
FIG. 13 is a schematic diagram showing an operation in which a virtual block address is associated with a physical block address by a dispersion process.

In a case where 8192 blocks in the flash memory 2 are classified into 8 zones as shown in FIG. 13, variables Nb0 to Nb7 are calculated as the total numbers of defective blocks classified into the zones #0 to #7, respectively. The maximum value among the variables Nb0 to Nb7 represents the maximum number of defective blocks to be classified into each zone.

For example, each of the variables Nb0 to Nb7 is calculated as follows.
Nb0=5,
Nb1=3,
Nb2=8,
Nb3=2,
Nb4=6,
Nb5=4,
Nb6=9,
Nb7=7.

In this case, the variable Nb6 representing the number of defective blocks to be classified into the zone #6 is the maximum value among the variables Nb0 to Nb7. Therefore, "9" represented by the variable Nb6 is the maximum number of defective blocks to be classified into each zone.

After the maximum number of defective blocks to be classified into each zone is specified for all of the plurality of replacement tables, one of the replacement tables that minimizes the maximum number is selected for performing the dispersion process. For example, the flash memory system 1 has five replacement tables Tb1 to Tb5. The maximum value among the variables Nb0 to Nb7 calculated for the replacement table Tb1 is Nb3=9. The maximum value among the variables Nb0 to Nb7 calculated for the replacement table Tb2 is Nb6=8. The maximum value among the variables Nb0 to Nb7 calculated for the replacement table Tb3 is Nb7=10. The maximum value among the variables Nb0 to Nb7 calculated for the replacement table Tb4 is Nb0=15. The maximum value among the variables Nb0 to Nb7 calculated for the replacement table Tb5 is Nb4=6. In this case, the replacement table Tb5 is selected as the table that minimizes the maximum number of defective blocks.

Figure 8:
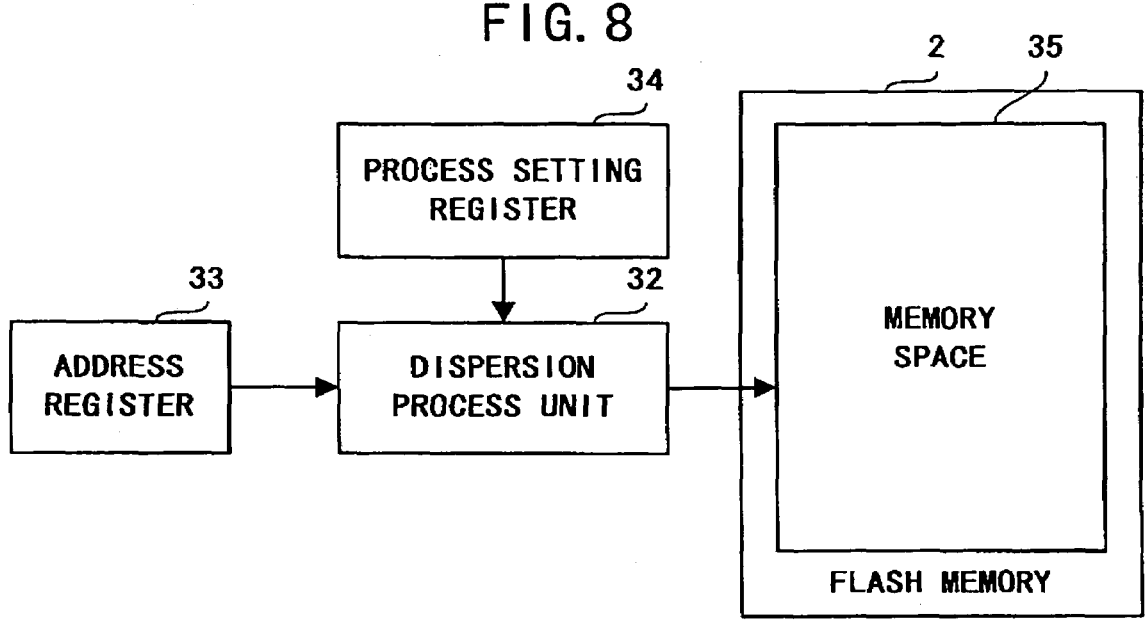
FIG. 8 is a block diagram showing a dispersion process unit, an address register, a process setting registers, etc.

The replacement table selected for performing the dispersion process is specified by the information stored in the process setting register 34 shown in FIG. 8. The replacement table selected in this manner is referred to by the dispersion process unit 32 for replacing the virtual block addresses VBA with physical block addresses PBA.

The correspondence between the virtual block address VBA and the physical block address PBA may be set by a function prepared in advance. In this case, the controller 3 pre-stores information defining plural kinds of functions in the flash memory system 1.

The controller 3 selects the function that minimizes the maximum number of defective blocks to be classified into each zone. The functions defined in the controller 3 are for generating a one to one mapping between the virtual block address space and the physical block address space. The zones into which defective blocks are classified can be specified by an inverse function of the function used in the dispersion process performed by the dispersion process unit 32.

It is preferred that the mapping generated by the functions defined in the controller 3 draws a cyclic orbit. In other words, it is preferred that the functions defined in the controller 3 have a predetermined mapping cycle. As one example of a mapping for generating a cyclic orbit, a tent mapping may be employed. A tent mapping is performed by using a function F(x) which is defined by the following equations (1) and (2).

In a case where a variable "x" satisfies $0 \leq x < 2^{(n-1)}$, $$F(x)=2x \qquad (1)$$

In a case where a variable "x" satisfies $2^{(n-1)} \leq x < 2^n$, $$F(x)=-2x+2^{(n+1)}-1 \qquad (2)$$

The blocks, which are the target of dispersion process, are assigned serial numbers sequentially from 0. In the equations (1) and (2), the variable "n" is substituted for by a number of digits necessary for representing the serial numbers assigned to the blocks in the format of binary code. For example, in a case where 8192 blocks are the target of the dispersion process, the maximum value "8191" among the serial numbers assigned to the blocks is represented as "1 1111 1111 1111" in the format of binary code. At this time, "13" is substituted for the variable "n". The functional value obtained by performing n+1 times of conversions using the function F(x) represented by the equations (1) and (2) coincides with the original value. In other words, the mapping generated by the function F(x) represented by the equations (1) and (2) has a recurring cycle T=n+1. For example, when "4" is substituted for the variable "n" and "1" as the original value is substituted for the variable "x", the functional value obtained by performing conversion five times using the function F(x) coincides with the original value "1", as shown below.
F(1)=2×1=2,
F(2)=2×2=4,
F(4)=2×4=8,
F(8)=−2×8+32−1=15,
F(15)=−2×15+32−1=1.

Let it be assumed that variables "a" and "b" representing the number of times conversion using the function F(x) is performed have a relationship represented by the following equation (3).

$$a+b=n+1 \qquad (3)$$

In this case, since the mapping generated by the function F(x) represented by the equations (1) and (2) has the recurring cycle T=n+1, "a" times of conversions using the function F(x) are the inverse conversion of the "b" times of conversions. For example, when "4" is substituted for the variable "n" and "1" is substituted for the variable "x" as the original value, a functional value "4" is obtained by performing conversion using the function F(x) twice. And when "4" is substituted for the variable "n" and "4" is substituted for the variable "x" as the original value, a functional value "1" is obtained by performing conversion using the function F(x) three times. It is preferred that the recurring cycle T of the mapping generated by the function F(x) and the total number M of blocks classified into each zone satisfy the relationship represented by the following equation (4).

$$M=2^{(T-1)} \quad (4)$$

FIG. 13 shows an example of a mapping using the function F(x) represented by the equations (1) and (2) between the virtual block address space and the physical block address space. In FIG. 13, the physical block address space in the flash memory 2 is divided into 8192 blocks. In order to perform the dispersion process using the function F(x) represented by the equations (1) and (2), a monitor register 36 shown in FIG. 14 for checking an output from the dispersion process unit 32 is used. Information representing a conversion performance number, which indicates the number of times conversion using the function F(x) is performed, is stored in the process setting register 34. In a case where 8192 blocks are included in the flash memory 2, the variable in the function F(x) is set to "13". The conversion performance number represented by the information stored in the process setting register 34 exists in the range of "0" to "13". The conversion performance number is set to a value that minimizes the maximum number of defective blocks to be classified into each zone.

The conversion performance number that minimizes the maximum number of defective blocks to be classified into each zone is determined in a manner described below. First, the controller 3 detects all the defective blocks included in the flash memory 2. In this detection process, information representing "0" is set in the process setting register 34 as the conversion performance number. That is, in a state where the virtual block addresses VBA are directly converted to the physical block addresses PBA, the controller 4 detects defective blocks by erasing, writing, reading, etc. of data in the flash memory 2. Then, the dispersion process unit 32 sets information representing "1" in the process setting register 34 as the conversion performance number, and after this, generates the mapping of the function F(x) by setting the physical block addresses PBA assigned to the defective blocks detected in the above-described detection process as the variable "x". The monitor register 36 stores results of conversion performed by the dispersion process unit 32. The values stored in the monitor register 36 are read as the virtual block addresses VBA of the defective blocks. The controller 3 counts the number of defective blocks included in each zone based on the virtual block addresses VBA of the defective blocks. The controller 3 updates the information stored in the process setting register 34 in a manner that the conversion performance number increments by 1. Each time a mapping group corresponding to the conversion performance number represented by the information stored in the process setting register 34 is generated by the dispersion process unit 32, the controller 3 counts the number of defective blocks included in each zone. The controller 3 detects the conversion performance number that minimizes the maximum number of defective blocks to be classified into each zone, by referring to the results of counting corresponding to the respective conversion performance numbers.

For example, let it be assumed that the maximum number of defective blocks in each zone is specified as described below in accordance with the respective numbers of times the conversion using the function F(x) is performed. When the conversion performance number is 1, the maximum number among the variables Nb0 to Nb7 is Nb4=8. When the conversion performance number is 2, the maximum number among the variables Nb0 to Nb7 is Nb6=10. When the conversion performance number is 3, the maximum number among the variables Nb0 to Nb7 is Nb1=9. When the conversion performance number is 4, the maximum number among the variables Nb0 to Nb7 is Nb5=11. When the conversion performance number is 5, the maximum number among the variables Nb0 to Nb7 is Nb3=13. When the conversion performance number is 6, the maximum number among the variables Nb0 to Nb7 is Nb2=9. When the conversion performance number is 7, the maximum number among the variables Nb0 to Nb7 is Nb0=8. When the conversion performance number is 8, the maximum number among the variables Nb0 to Nb7 is Nb6=6. When the conversion performance number is 9, the maximum number among the variables Nb0 to Nb7 is Nb4=8. When the conversion performance number is 10, the maximum number among the variables Nb0 to Nb7 is Nb7=10. When the conversion performance number is 11, the maximum number among the variables Nb0 to Nb7 is Nb2=7. When the conversion performance number is 12, the maximum number among the variables Nb0 to Nb7 is Nb0=9. When the conversion performance number is 13, the maximum number among the variables Nb0 to Nb7 is Nb3=12.

In this case, the maximum number of defective blocks to be classified into each zone is minimized when the conversion performance number is 8. When the number of defective blocks classified into each zone is counted, the physical block addresses PBA of the defective blocks are converted to the virtual block addresses VBA. On the contrary, when the virtual block addresses VBA are converted to the physical block addresses PBA, inverse conversion of the conversion performed the number of times corresponding to the above-described conversion performance number is performed. Based on the variable "a" and variable "b" satisfying the equation (3), the mapping obtained by repeating the conversion using the function F(x) "b" times is the inverse mapping of the mapping obtained by repeating the conversion using the function F(x) "a" times. Accordingly, when the conversion performance number which is specified by the conversion from the physical block addresses PBA to the virtual block addresses VBA and which minimizes the maximum number of defective blocks is represented by the variable "a", the virtual block addresses VBA are converted to the physical block addresses PBA in a manner that the maximum number of defective blocks is minimized, by repeating the conversion the number of times corresponding to the variable "b" which is specified by the following equation (5).

$$b=n+1-a \quad (5)$$

In the above-described example, the variable "b" is specified as "6" in accordance with the variable n=13, and the variable a=8. Thus, information representing "6" is set in the process setting register 34 as the conversion performance number.

When there is a request from the host system 4 for access to the flash memory 2, the controller 3 sets information representing the conversion performance number in the process setting register 34, and after this, starts a data reading operation, a data writing operation, etc. based on the information set in the address register 33 and representing the virtual page addresses. The dispersion process unit 32 replaces the part representing the virtual block addresses VBA in the virtual page addresses with the physical block addresses PBA, in accordance with the request from the host system 4. The physical page addresses generated by the dispersion process unit 32 are supplied to the memory space 35 of the flash memory 2. When block erasing is to be executed, by setting information representing the virtual block addresses VBA in the address register 33, the physical block addresses PBA are supplied to the memory space 35 of the flash memory 2.

When the virtual block address space is divided into many zones, each zone may be classified into one of a plurality of groups. In this case, the dispersion process unit 32 may perform conversion between the virtual block addresses VBA and the physical block addresses PBA in the unit of group. For example, in a case where 32 zones are classified into 4 groups, the dispersion process unit 32 performs conversion between the virtual block addresses VBA and the physical block addresses PBA by each 8 zones. In a case where the flash memory 2 includes a plurality of memory chips, the dispersion process unit 32 may perform conversion between the virtual block addresses VBA and the physical block addresses PBA chip by chip. The settings for the replacement tables, the function, the conversion performance number, etc, may be different group by group or chip by chip.

The function for defining the correspondence between the virtual block addresses VBA and the physical block addresses PBA may be arbitrarily set. For example, the function may be an arbitrary mapping function for forming a cyclic orbit, such as a Bernoulli mapping.

Figure 14:
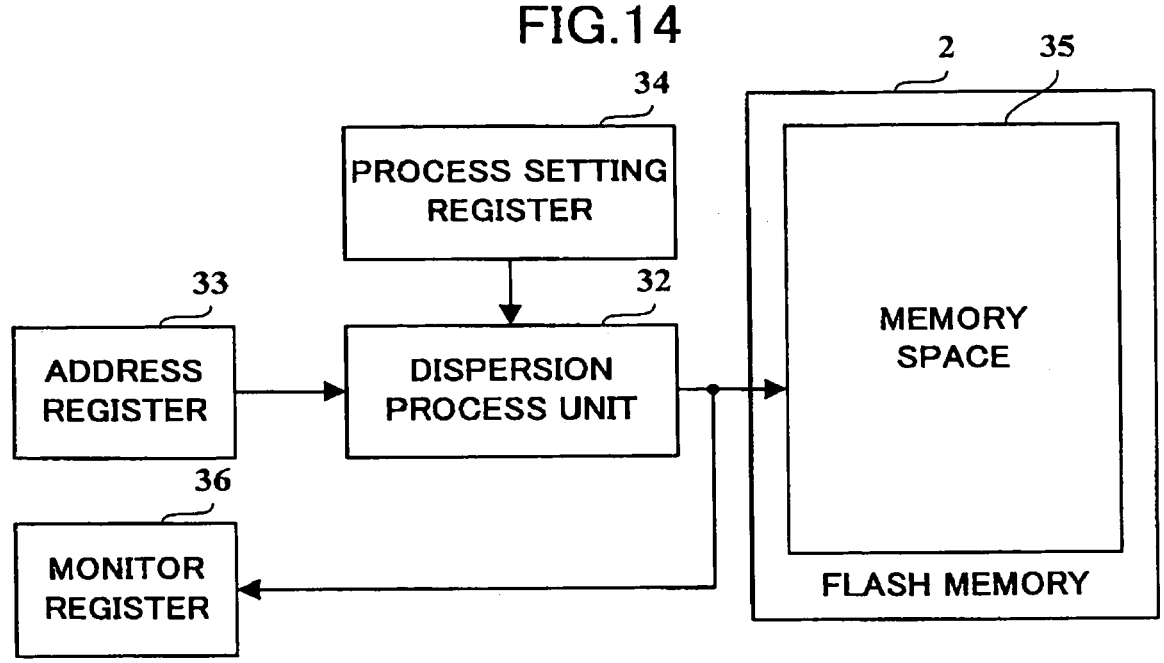
FIG. 14 is a schematic diagram showing an example of a structure including a monitor register.
Figure 15:
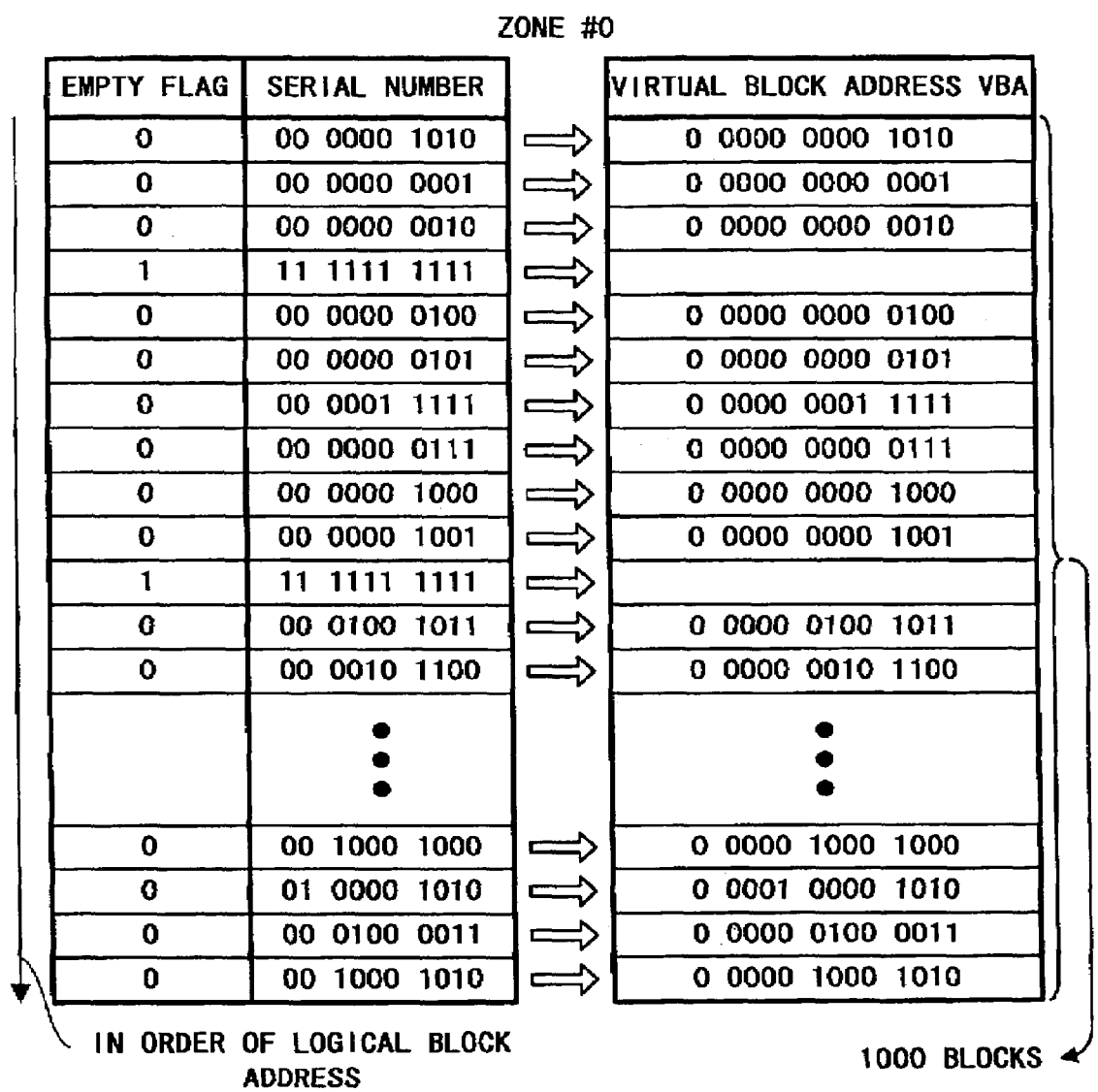
FIG. 15 is a schematic diagram showing an example of an address translation table.

When a data reading operation or a data writing operation is performed based on the information stored in the address register 33 shown in FIG. 14, it is preferred that the controller 3 provides the host system 4 with access to the flash memory 2 by using an address translation table representing the correspondence between the logical block addresses LBA and the virtual block addresses VBA. The address translation table is generated by the controller 3 in accordance with each of the plurality of zones. For example, in the address translation table, the serial numbers assigned to the respective blocks in the virtual block address space are described in the order of the logical block addresses LBA as shown in FIG. 15. The serial numbers assigned to the respective blocks in the virtual block address space are converted to the virtual block addresses VBA by inserting the zone number into the higher-order bits than the bits for the serial numbers. For example, in the zone #0, a virtual block address VBA corresponding to the zone #0 is generated by inserting "000" in the format of binary code into the higher-order bits than the bits for the serial number.

The address translation table also includes information representing an "empty" flag. The empty flag makes it possible to identify whether data is stored in a block corresponding to a logical block address LBA. In the example shown in FIG. 15, by the empty flag indicating "1", it is identified that there is no virtual block address VBA that corresponds to a logical block address LBA. No data is stored in the logical block address LBA that has no associated virtual block address VBA in the address translation table.

When the controller 3 generates such an address translation table as shown in FIG. 15, first, an area for storing serial numbers and empty flags corresponding to 1,000 blocks are secured in the work area 8. At this time, the stored data in the secured area are all set to a logical value "1". Then, in the range for which the address translation table manages the correspondence between the virtual block addresses VBA and the logical block addresses LBA, the stored data in the redundant areas 26 are read in the order of the virtual block addresses VBA. If the stored data in a give redundant area 26 represents a specific logical block address LBA as the corresponding logical block address, the serial number of the block is written in the row of this logical block address in the address translation table. Further, the empty flag corresponding to the logical block address LBA is set to a logical block value "0". The controller 3 can convert the virtual block address VBA into the serial number of the block by removing the bits representing the zone number from the virtual block address VBA. In the address translation table, in the row of a logical block address LBA which is not represented by the stored data in any redundant area 26, the empty flag is kept at the logical value "1" as the initial setting.

When the stored data in the flash memory 2 is rewritten, an erased block in which data for rewriting that includes new data is to be written needs to be specified. A process for specifying an erased block will now be explained below.

In this process, a search table 40 shown in FIG. 16A is used. In this search table 40, each of a plurality of bits shown is associated with one of the virtual block addresses VBA of the plurality of blocks which are classified into specific zones respectively. It is preferred that a plurality of the search tables 40 are generated by the controller 3 in accordance with the plurality of zones.

In the example shown in FIG. 16A, the virtual block addresses VBA increments in the rightward direction and in the downward direction in the search table 40. For example, the bit in the uppermost and leftmost section in the search table 40 shown in FIG. 16A is associated with the first virtual block address VBA in the zone corresponding to this search table 40. The bit in the lowermost and rightmost section in the search table 40 shown in FIG. 16A is associated with the last virtual block address VBA in the zone corresponding to this search table 40. The bit representing a logical value "0" in the search table 40 shown in FIG. 16A indicates that the block having the virtual block address VBA which is associated with this bit either stores data or is a defective block. The bit representing a logical value "1" in the search table 40 indicates that the block having the virtual block address VBA which is associated with this bit is in the erased state.

The search table 40 can be generated at the same time as the address translation table is generated. For example, in the search table 40, the logical value "0" is set for all the bits as the initial state. After this, the controller 3 determines for each block having the virtual block address VBA associated with one of the bits whether a corresponding logical block address or a block status, which represents that the concerned block is a defective block, is stored in the redundant area 26 or not. If the controller 3 determines that neither a corresponding logical block address nor a block status representing that the block is a defective block is stored, the bit corresponding to the virtual block address VBA of the concerned block is set to the logical value "1". In this manner, in the search table 40, only the bits which are associated with erased blocks are set to the logical value "1", while the other bits are kept at the logical value "0".

When data is written in an erased block after the search table 40 is generated, the bit associated with this block is updated from the logical value "1" to the logical value "0" in the search table 40. When block erasing is executed on the block which has been storing data, the bit associated with this block is updated from the logical value "0" to the logical value "1" in the search table 40.

A process for searching for an erased block by using the search table 40 will now be explained with reference to FIG.

16B. In this process, the controller 3 scans the search table 40 in the direction advancing from the bit in the upper/leftmost section which is associated with the first virtual block address VBA in a specific zone towards the bit in the lower/rightmost section which is associated with the last virtual block address VBA in the zone. For example, the controller 3 sequentially checks the bits from the left to the right in a given row in the search table 40, and then likewise checks the bits in the row right under the given row. The controller 3 detects a bit that represents the logical value "1" corresponding to an erased block.

In the search table 40 shown in FIG. 16B, a bit representing the logical value "1" is detected in the fourth row, the fifth column. In response to that the bit representing the logical value "1" is detected, the controller 3 finishes searching in the search table 40. At this time, the controller 3 specifies the virtual block address VBA associated with this bit representing the logical value "1". The controller 3 writes data for rewriting that includes new data in the block having the thusly specified virtual block address VBA. The bit next to the end point of the searching may be the start point in the next searching process. For example, in the search table 40 shown in FIG. 16B, the next searching process is started with the start point set in the fourth row, sixth column. In the searching process, after the lower/rightmost bit is checked, the checking operation returns to the upper/leftmost bit.

A data reading operation for reading data from the flash memory 2 in response to a request from the host system 4 will now be explained below. In this data reading operation, a logical block address LBA which is designated by an address signal output from the host system 4 to the controller 3 is converted into a virtual block address VBA with the use of the address translation table shown in FIG. 15. The following information is set in the plurality of registers owned by the flash sequencer block 12. First, an internal read command is set as an internal command in a predetermined first register (not shown) in the flash sequencer block 12. Second, a virtual page address including a virtual block address VBA specified by the address translation table and 5-bit data (in case of one block including 32 pages) representing a page number is set in the address register 33 shown in FIG. 8 and in FIG. 14.

Based on the above-described information set for the data reading operation, the flash sequencer block 12 controls the flash memory interface 10 in accordance with the internal command. The flash memory interface block 10 supplies information representing the internal command, information representing the address, etc. to the flash memory 2 via the internal bus 14. The virtual page address is converted into a physical page address by the dispersion process unit 32 shown in FIG. 8 and FIG. 14. Accordingly, the information supplied to the flash memory 2 represents a physical page address. In the flash memory 2, data stored in a data area corresponding to the physical page address specified by the information supplied from the controller 3 is read. The data read from the flash memory 2 is transferred to the buffer 9 via the internal bus 14. As a result, the data which has been stored in the data area having the physical page address associated with the virtual page address set in the address register 33 is retained in the buffer 9.

Next, a data writing operation for writing data in the flash memory 2 in response to a request from the host system 4 will now be explained below. In this data writing operation, the following information is set in the plurality of registers owned by the flash sequencer block 12. First, an internal write command is written in the first register in the flash sequencer block 12 as an internal command. Second, a virtual page address including a virtual block address VBA of an erased block which is specified by the search table 40 and 5-bit data (in case of one block including 32 pages) representing a page number is set in the address register 33 shown in FIG. 8 and FIG. 14.

Based on the above-described information set for the data writing operation, the flash sequencer block 12 controls the flash memory interface block 10 in accordance with the internal command. The flash memory interface block 10 supplies the information representing the internal command, the information representing the address, etc. to the flash memory 2 via the internal bus 14. The virtual page address is converted into a physical page address by the dispersion process unit 32 shown in FIG. 8 and FIG. 14. Accordingly, the information supplied to the flash memory 2 represents a physical page address. The flash memory interface block 10 transfers data in the buffer 9 to the flash memory 2 via the internal bus 14. As a result, the data supplied from the controller 3 to the flash memory 2 is written in the data area having the physical page address associated with the virtual page address set in the address register 33.

In the above-described data writing operation, if old data that should be erased is stored in the flash memory 2, a data erasing operation for the block storing the old data is performed after the data writing operation. The virtual block address VBA of the block storing the old data can be specified by using the address translation table shown in FIG. 15. In this data erasing operation, the following information is set in the plurality of registers of the flash sequencer block 12. First, an internal erase command is registered in the first register of the flash sequencer block 12 as an internal command. Second, a virtual page address including a virtual block address VBA of the block storing the old data and 5-bit data (in case of one block including 32 pages) representing a page number is set in the address register 33 shown in FIG. 8 and FIG. 14.

Based on the above-described information set for the data erasing operation, the flash sequencer block 12 controls the flash memory interface block 10 in accordance with the internal command. The flash memory interface block 10 supplies the information representing the internal command corresponding to the data erasing operation, the information representing the address, etc. to the flash memory 2 via the internal bus 14. The virtual page address is converted into a physical page address by the dispersion process unit 32 shown in FIG. 8 and FIG. 14. Accordingly, the information supplied to the flash memory 2 represents a physical page address. As a result, the controller 3 completes the data erasing operation on the block which has been storing the old data in the flash memory 2.

The controller 3 performs a process for minimizing the maximum number of defective blocks to be classified into each zone by using a plurality of replacement tables or a plurality of functions. Due to this, even in a case where many defective blocks exist in a certain part of the flash memory 2, the controller 3 can properly store data supplied from the host system 4 in each of the plurality of zones.

Modifications and applications of the present invention are available in various manners. For example, the dispersion process unit 32 shown in FIG. 6 may be provided in the flash memory 2. The controller 3 may control data exchange between the flash memory 2 and the host system 4 independently from the flash memory system 1. The controller 3 may be built in the host system 4. The address register 33 and the process setting register 34 may be replaced with arbitrary memories such as an SRAM, a DRAM (Dynamic RAM), etc.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2003-435662 filed on Dec. 26, 2003 and including specification, claims, drawings and summary. The disclosure of the above Japanese Patent Application is incorporated herein by reference in its entirety.

What is claimed is:

1. A memory controller comprising
   a managing module which is so constituted to manage a correspondence between a virtual address space of a flash memory which is divided into a plurality of zones each including a predetermined number of blocks and a logical address space in a host system; and
   a classification controlling module which determines blocks to be classified into each of said plurality of zones, by said management module into a physical address, by managing a correspondence between virtual addresses and physical addresses of blocks to be classified into each of said plurality of zones,
   wherein
   said classification controlling module has in advance a function for generating a one-to-one mapping, so as to associate virtual addresses of blocks to be classified into each of said plurality of zones with physical addresses in said flash memory; and determines blocks to be classified into each of said plurality of zones, by using the function,
   the function is a function for generating a tent mapping, and
   in a case where a recurring cycle of the tent mapping is T, and a total number of blocks to be classified into any of said plurality of zones is N, T and N satisfy a following relationship $N=2^{(T-1)}$.

2. A flash memory system comprising:
   a non-volatile flash memory;
   a managing module which manages a correspondence between a virtual address space of said flash memory which is divided into a plurality of zones each including a predetermined number of blocks, and a logical address space in a host system and converts a logical address supplied from the host system into a virtual address of the flash memory; and
   a classification managing module which determines blocks to be classified into each of said plurality of zones and converts the logical address obtained by said management module into a physical address, by managing a correspondence between virtual addresses and physical addresses of blocks to be classified into each of said plurality of zones;
   wherein,
   said classification controlling module has in advance a function for generating a one-to-one mapping, so as to associate virtual addresses of blocks to be classified into each of said plurality of zones with physical addresses in said flash memory; and determines blocks to be classified into each of said plurality of zones, by using the function;
   the function is a function for generating a tent mapping; and
   in a case where a recurring cycle of the tent mapping is T, and a total number of blocks to be classified into any of said plurality of zones is N, T and N satisfy a following relationship $N=2^{(T-1)}$.

* * * * *